(12) United States Patent
Donnellan et al.

(10) Patent No.: US 9,326,091 B2
(45) Date of Patent: Apr. 26, 2016

(54) NEAR FIELD COMMUNICATION AUTOMATIC SELF-PROVISIONING

(71) Applicant: Cellco Partnership, Basking Ridge, NJ (US)

(72) Inventors: Kevin Donnellan, North Brunswick, NJ (US); Mohammad Raheel Khalid, Budd Lake, NJ (US); Ji Hoon Kim, Lyndhurst, NJ (US); Zhengfang Chen, Millburn, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 142 days.

(21) Appl. No.: 14/095,458

(22) Filed: Dec. 3, 2013

(65) Prior Publication Data

US 2015/0156601 A1 Jun. 4, 2015

(51) Int. Cl.
| | |
|---|---|
| H04W 12/06 | (2009.01) |
| H04W 4/00 | (2009.01) |
| H04B 5/00 | (2006.01) |
| H04W 76/02 | (2009.01) |
| H04B 5/02 | (2006.01) |

(52) U.S. Cl.
CPC ............ *H04W 4/008* (2013.01); *H04B 5/0031* (2013.01); *H04B 5/02* (2013.01); *H04W 4/001* (2013.01); *H04W 12/06* (2013.01); *H04W 76/02* (2013.01); *H04B 5/0075* (2013.01)

(58) Field of Classification Search
CPC .... H04B 5/0031; H04W 12/06; H04W 4/008; H04W 76/02
See application file for complete search history.

(56) References Cited

U.S. PATENT DOCUMENTS

| | | | |
|---|---|---|---|
| 2008/0081608 A1* | 4/2008 | Findikli et al. | 455/425 |
| 2008/0090520 A1* | 4/2008 | Camp et al. | 455/41.2 |
| 2010/0063893 A1* | 3/2010 | Townsend | 705/26 |
| 2014/0138435 A1* | 5/2014 | Khalid | 235/380 |

* cited by examiner

*Primary Examiner* — David Bilodeau

(57) ABSTRACT

Examples are disclosed that facilitate using a mobile device to provision of a connectable device to a user account. The disclosed examples provide for provisioning a connected device by a mobile device that uses a near field communication (NFC) transceiver in the mobile device to obtain information identifying a connectable device. The information identifying the connectable device is obtained from a NFC transponder associated with the connectable device. The mobile device processor accesses user account-related information to retrieve user authenticating information. The user authenticating information and the information identifying the connectable device is transmitted via a wireless communication transceiver to a provisioning server for provisioning the connectable device in a network. A confirmation of the provisioning of the connectable device to the user account associated with the mobile device is presented in a user interface element of the mobile device.

20 Claims, 4 Drawing Sheets

100

200

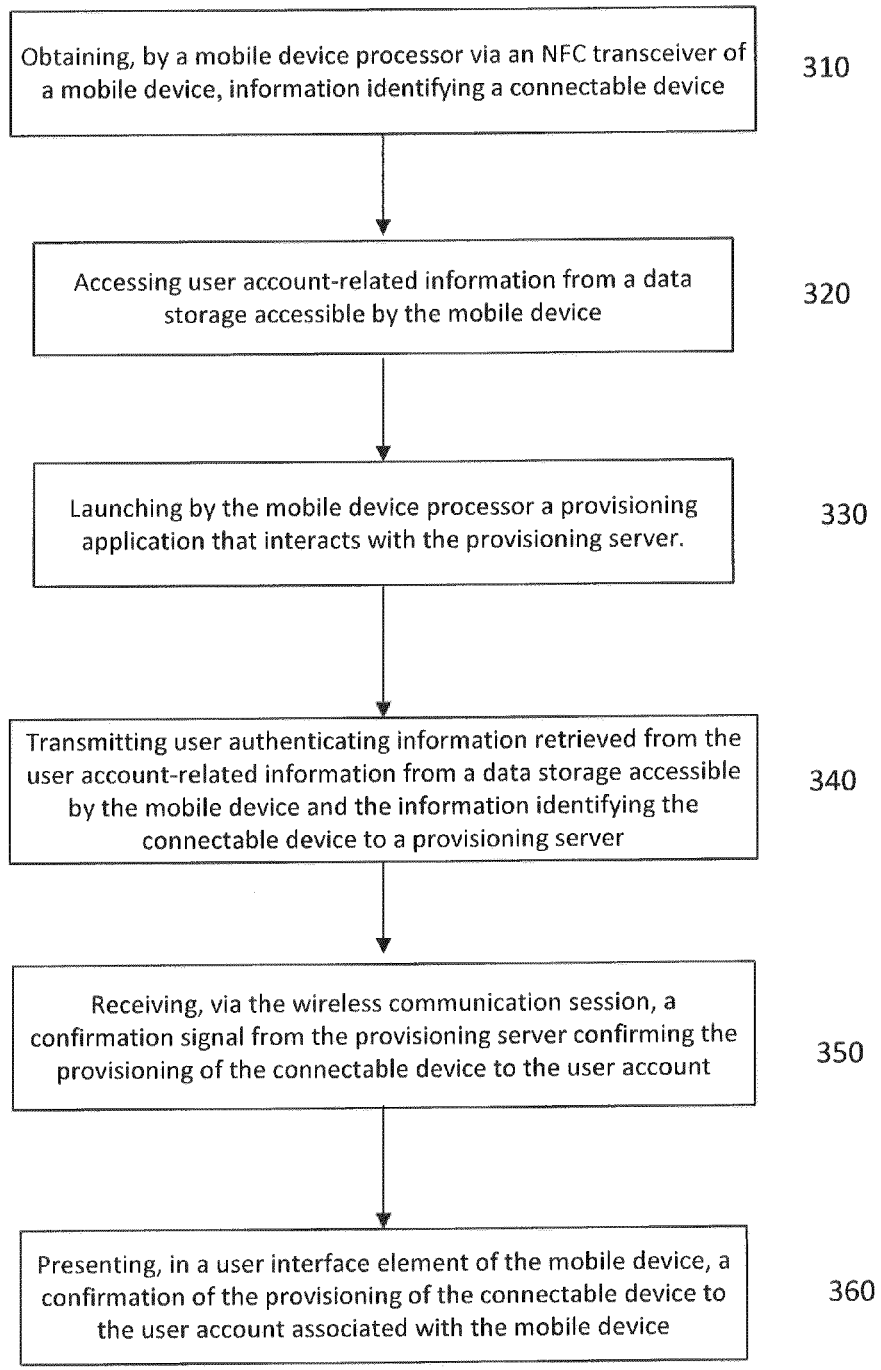

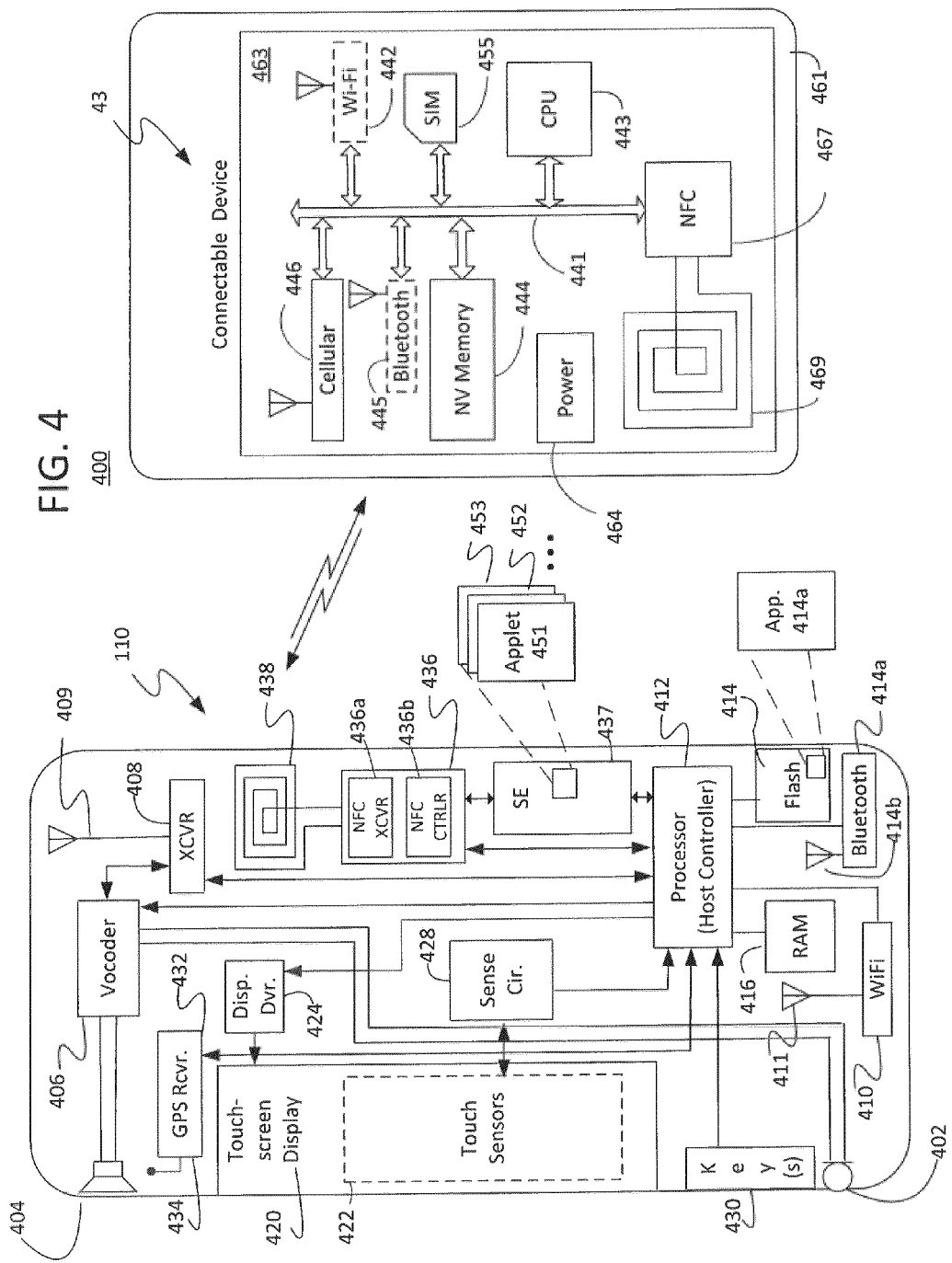

NEAR FIELD COMMUNICATION AUTOMATIC SELF-PROVISIONING

BACKGROUND

In recent years, a number of devices are becoming capable of connecting to communication networks to provide or receive digital media content. The diversity of devices that are capable of connecting to a communications network includes more than just computers, such as laptops and desktops. Also included are LTE-enabled cameras or tablets, Wi-Fi enabled music players, video gaming devices as well as wearable accessories, such as glasses and wristwatches, and the like.

In order for these devices to communicate through a wireless communication network, the device must be provisioned to a user account in the respective network that is providing the wireless communication service or the delivery of the digital media content. This provisioning process may be tedious, as a large amount of data has to be provided in order to provision the device. In order to provision a device in a network, a user may have to talk with a person either in person at a store, or via a telephone or computer chat session, and provide information not only identifying the connectable device, but also information identifying the user and/or user account information. The process may be lengthy and fraught with opportunities for confusion, mistakes and, ultimately frustration on the part of the user with the provisioning system.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is another process flowchart showing an example of a mobile device provisioning a connectable device in a system.

FIG. 4 is a high-level functional block diagram of an exemplary touch screen type mobile station and a connectable device that may utilize a communication system for provisioning the connectable device as shown in FIGS. 1-3.

DETAILED DESCRIPTION OF EXAMPLES

Figure 1:
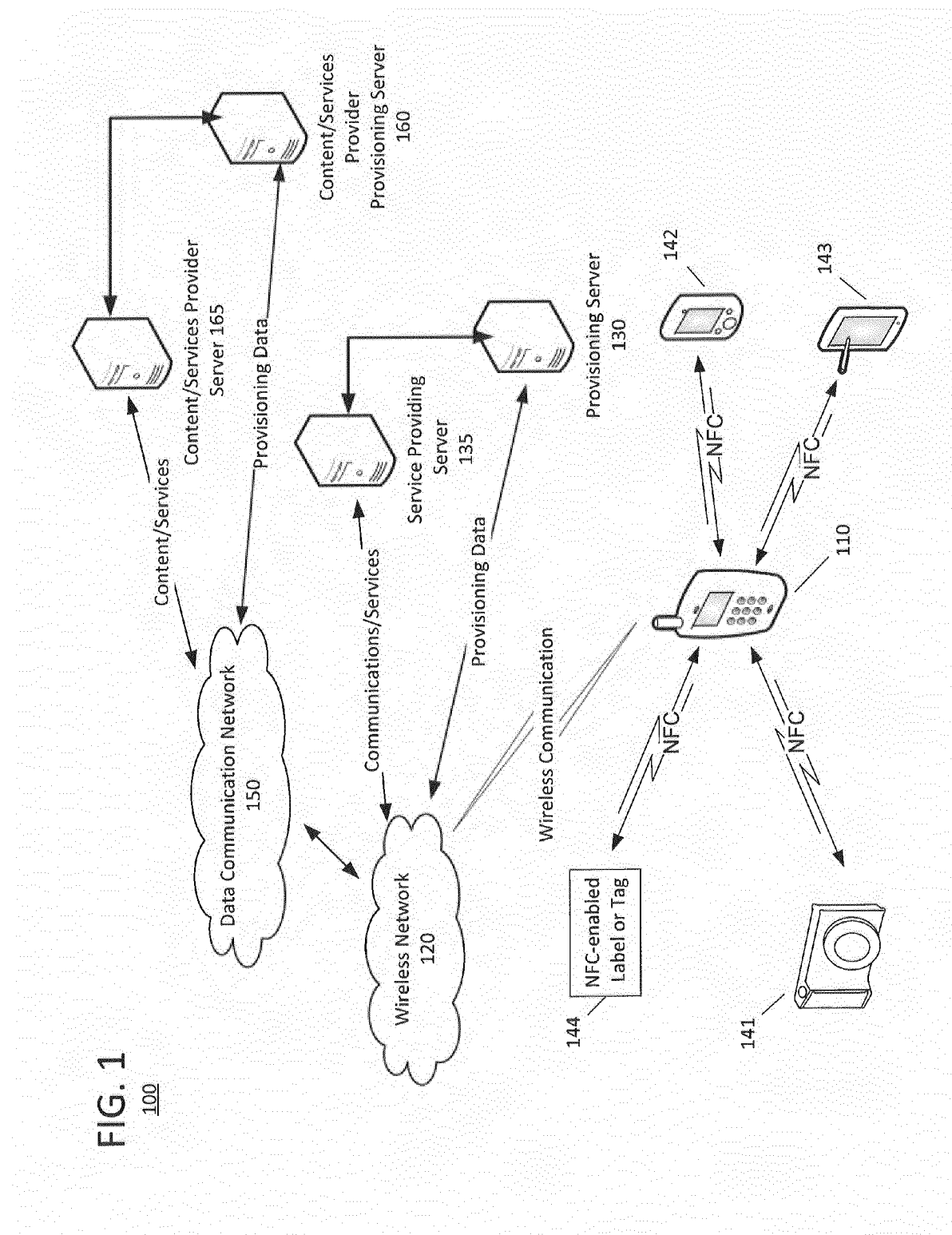
FIG. 1 is a high-level functional block diagram that illustrates an example of a system for provisioning a connectable device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a mobile device configured to provision a connectable device to a user account. Provisioning is a process for providing data about a connectable device and/or a network and a user account to associate the connectable device with a network/carrier user account, so the connectable device can connect to the network, and operate and obtain services through the network. Such provisioning, for example, may involve entry or modification of account information with the network provider to add the device, establishing permissions or policies applicable to the device in one or more control elements in the network and/or storing some requisite data (e.g., an identifier assigned by the network operator) in the device itself. A connectable device is a device equipped to connect to a network using wired (e.g., optical or coaxial) or wireless technologies, such as cellular, Wi-Fi access points, Bluetooth or other radio frequency technologies.

In several examples described in detail below, a mobile device used in a provisioning process includes at least one user interface element, a wireless communication transceiver, a near field communication (NFC) transceiver, and a processor. The processor is coupled to the at least one user interface element, the wireless communication transceiver, the NFC transceiver and has access to a storage device. The processor is configured to control the mobile device to perform a variety of functions. In an example, the processor is configured to obtain, via the NFC transceiver, provisioning information related to a connectable device from an NFC transponder associated with the connectable device. Information identifying the connectable device is retrieved by the processor from the obtained provisioning information. The processor may communicate with a provisioning server. The processor transmits the information identifying the connectable device and information related to a user account to the provisioning serve. The provisioning server may use the transmitted information to provision the connectable device to the user account in the network. The provisioning server may send the mobile device processor a signal confirming the provisioning of the connectable device. The processor receives the signal from the provisioning server confirming the connectable device is provisioned to the user account in the network.

In an example of a method for provisioning a connected device using a mobile device, a near field communication (NFC) transceiver is used by a mobile device processor to obtain information identifying a connectable device. The information identifying the connectable device is obtained from a NFC transponder associated with the connectable device. The transponder, tor example, may be an integral component of the device or a tag on the device or on the packaging of the connectable device. The mobile device processor accesses user account-related information from which is retrieved user authenticating information. The user authenticating information and the information identifying the connectable device is transmitted via a wireless communication transceiver to a provisioning server for provisioning the connectable device in a network. In a user interface element of the mobile device, a confirmation of the provisioning of the connectable device to the user account associated with the mobile device is presented.

In another example of a connectable device provisioning method, a mobile device processor equipped with a near field communication (NFC) transceiver obtains via the NFC transceiver information identifying a connectable device. The mobile device processor accesses user account-related information and retrieves user authenticating information. Via a wireless communication transceiver of the mobile device, the processor transmits the user authenticating information and the information identifying the connectable device to a provisioning server. The provisioning server using the user authenticating information and the connectable device identifying information may provision the connectable device in a network. A confirmation of the provisioning of the connectable device to the user account associated with the mobile device is presented in a user interface element of the mobile device.

The above examples and following discussion discloses a system, device and method for providing a provisioning service that reduces the opportunities for error, adds security and provides greater efficiency over prior provisioning methods. A high-level functional block diagram of an example of a system for implementing a provisioning service as discussed herein is illustrated in FIG. 1. In the further example below, the provisioning steps provide information related to a device and/or a network that is used to associate the device with a user account accessible through the network, such as a media content service provider, or a user network carrier account, such as a cellular network provider account and thereby allow the device to utilize communication services available through the network. The information provided to, obtained by, or maintained by a provisioning server may be information related to the connectable device, a user account, a provisioned mobile device, an unprovisioned mobile device, a media content provider, or a network, and may include information related to details of a user's data sharing plan, a (LTE-enabled) device International Mobile Station Equipment Identity (IMEI), an integrated Circuit Card Identifier (IccID) of a (LTE-enabled) device's subscriber identity module (SIM), (or in the case of a CDMA enabled device, a Mobile Equipment Identifier (MEID), a user name, a user address, security features, such as a PIN identifier, a biometric (facial or fingerprint) input, an audio input, an image-based input (e.g. camera image of an object that is associated with account (e.g. user last name is "Kane," and security image is a picture of a cane), an account passcode or the like, identifiers of other devices provisioned to the user account, and the like. The provisioning server may also transmit information to the connectable device prior to, during or after the provisioning process. For example, the provisioning server may transmit a mobile directory number, data storage addresses, service provider URLs and the like for delivery by the mobile device to the connectable device, or directly to the connect device. Once a device is provisioned in the network, the connected device is able to receive and access content and services through the network.

Reference now is made in detail to the examples illustrated in the accompanying drawings and discussed below. As shown in FIG. 1, an exemplary system can include a mobile device 110, a wireless network 120, a provisioning server 130, a communications/services server 135, and connectable devices 141-144. In addition, the wireless network 120 may be communicatively coupled to a data communication network 150, such as the Internet. A wireless communication system including the provisioning server 130, a communicatively coupled to the communications/services server 135 may be configured to not only provide wireless communications, such as cellular or Wi-Fi communications, but also provide digital media content, other services, access to other systems and networks that provide services, and the like. The server 135 is shown by way of a convenient example of an element of, or that is associated with, the network that may offer or control the actual network communications services, content services, etc. that the network service provider may offer to users of mobile devices and other devices once provisioned for operation on the network 120. Provisioning of a device to operate on the network 120 and/or to receive content service of the network service provider may entail installation of some data in the server 135 or other control or service providing elements in the network 120 or otherwise operated by the entity operating the network 120.

The data communication network 150 is communicatively coupled to one or more servers, such as a content/services provider provisioning server 160 and content/services provider server 165. The content/services provider provisioning server 160 and content/services provider server 165 are also communicatively coupled to one another. The content/services provider server 165, in some examples, provides digital media content and services, such as data sharing or access to social websites. In a system, the content/services provider provisioning server 160 and content/services provider server 165 provide a user with the capabilities to create user accounts, provision devices into the network, and access to services and content provided by the system. A content provider may be an entity that provides digital media content through the network 150 or 120. The server 165 is shown by way of any example of a system element that may provide an actual content service and/or may receive data for service control or the like as a result of provisioning a new device for accessing the particular service.

The provisioning server 130 and the service providing server 135 are communicatively coupled to the wireless network 120. The wireless network 120 may be operated by a network carrier, such as cellular telephone service provider, that allows devices to communicate through the network 120 with other networks, such as data communication network 150, other devices and/or servers, such as servers 160, 165. The wireless network 120 may provide communication with data communication networks, such as the Internet, allowing data, such as digital content, to be provided to the mobile device 110. In the example, a carrier/provider that operates network 120 utilizes the provisioning server 130 in the process of setting-up or provisioning devices to operate on the network 120. Other similar servers, such as content/services provider provisioning server 160 may be used to provision devices on other networks or services.

The provisioning server 130 or 160 may provision a device to the user account by associating the device in a database with a user's account and configuring account settings with respect to the connectable device according to the associated user account settings. For example, devices provisioned in the wireless network 120 may be provided with a set capacity of cloud-based data storage that is partitioned based on the number of devices associated with a user account. When the connectable device is provisioned, the user account settings may be modified, for example, to reflect the re-partitioning of the cloud-based data storage to account for the added device. Once provisioned, a device may communicate with other devices and obtain services, via, for example, server 135 provided by the network carrier through the wireless network 120 including obtaining or delivering content to servers, such as servers 165 and 160 connected to the data communication network 150. Although only one instance of each server 130, 160 appears in the drawing; multiple instances may be deployed to handle the expected volume of provisioning traffic. Similarly, although only one instance of each server 135, 165 appears in the drawing; multiple instances may be deployed to handle the expected volume of content downloading/uploading or services-related traffic. The provisioning server 130 or 160 may perform other functions than provisioning. However, service providing server 135 or content/services provider server 165 may be configured to provide a combination of services. For example, the service provider server 135 may provide some or all of the services to the mobile device 110, such as cellular communication, data sharing, Internet or navigation services, but, in some instances, also provide content, such as movies, television, e-books, e-magazines, games, advertisements and other digital media content. Content/services provider server 165 may provide content and services similar and/or different from the service provider server 135. Of course, a user account maintained by one of provisioning servers 130, 160 may have one or more mobile devices 110 associated with the particular user account. A user may also have multiple user accounts in a provisioning server.

A connectable device, as discussed herein, is a device that is equipped and configured to connect to a network. For example, a connectable device may be equipped with a wireless transceiver, such as a cellular transceiver, Wi-Fi transceiver or Bluetooth transceiver, that allows the connectable device to connect to a network, such as wireless network 120 and/or data communication network 150. Examples of connectable devices as shown in FIG. 1, include a cellular-enabled camera 141, a Wi-Fi connectable MP3/video player 142, a cellular and/or Wi-Fi-enabled tablet or smartphone device 143, or other connected devices (not shown for case of illustration), such as a desktop computer, a cellular telephone, a wearable device, refrigerator and the like. Although not shown, another as yet unprovisioned mobile device may be provisioned via mobile device 110. Mobile device 110 and connectable devices 141-143 in addition to being able to access a network are also NFC-enabled. In some cases, a connectable device may not be NFC-enabled. In which case, an NFC-enable label or tag 144 is associated with the connectable device. For example, an NFC-enabled label 144 may be affixed to the connectable device, to packaging of the connected device, or may be provided with the connected device, for interrogation by a mobile device 110.

The mobile device 110, which will be described in more detail with respect to FIG. 4, is equipped with at least one user interface element, a wireless communication transceiver, a near field communication (NFC) transceiver, a processor coupled to the at least one user interface element, the wireless communication transceiver and the NFC transceiver, and a storage device accessible by the processor. The processor is configured to control the mobile device to perform a variety of functions, including functions related to provisioning a connectable device.

The connectable devices 141-143 or the connectable device associated with the NFC enabled label or tag 144 may be either long term evolution (LTE) compatible or non-LTE compatible (e.g. CDMA or only Wi-Fi). In either case, the functional aspects of provisioning a connectable device are similar. Differences may be present in the connectable device parameters that are provided to the provisioning server. For example, in the case in which the connectable device is an LTE device, the LTE parameter obtained from the NFC enabled label or tag 144 or from one of the connectable devices 141-143 are a device's IMEI and the device's SIM card ICCID, whereas the device parameter for a CDMA enabled device is the device's MEID. Of course, other parameters may be provided.

Figure 2:
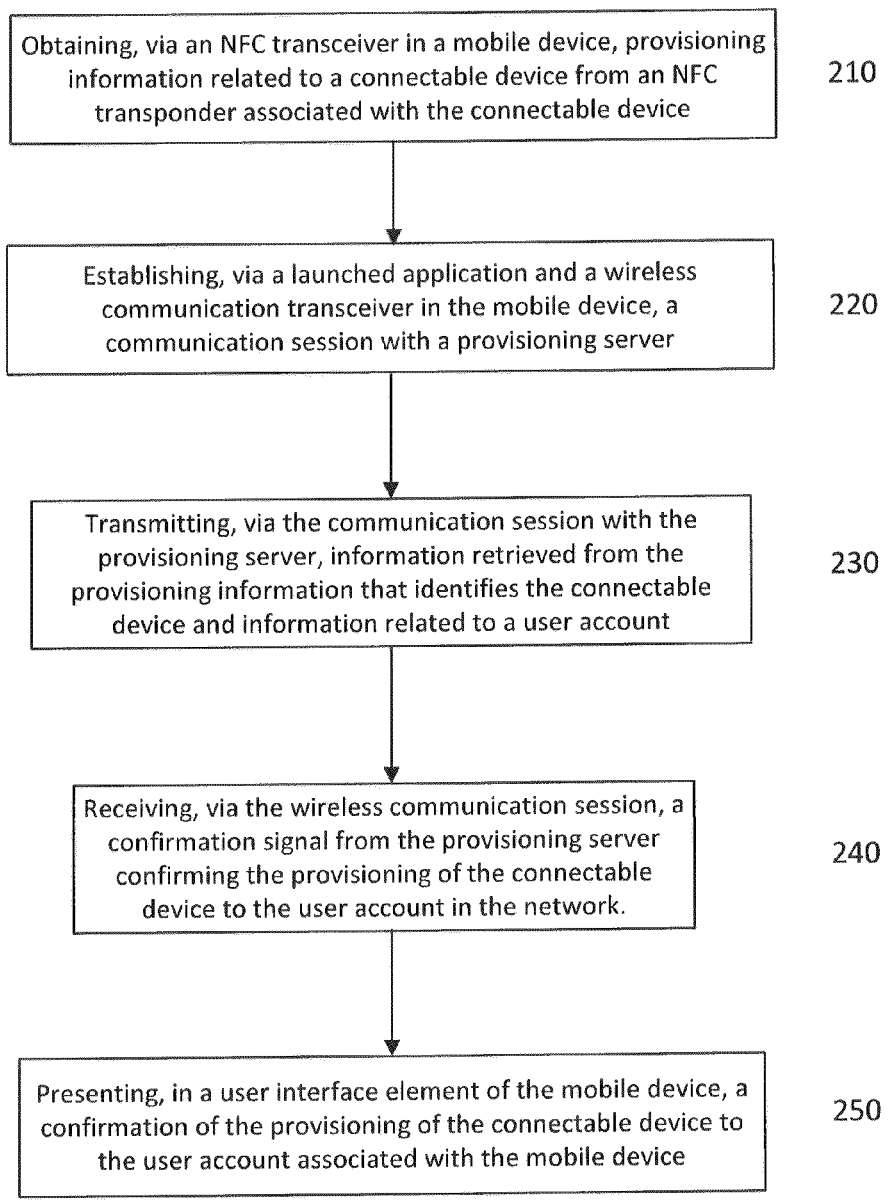
FIG. 2 is a process flowchart of an example of a mobile device provisioning a connectable device in a system.

FIG. 2 illustrates an example of a provisioning process in which a mobile device is used to facilitate provisioning of a connectable device to a user account. The process 200 involves for example, an NFC-enabled and wireless communication-enabled mobile device, such as mobile device 110. The process also involves a connectable device, such as any of devices 141-143 or NFC tag 144 that is associated via the connected device packaging as described in FIG. 1. In the example of FIG. 2, the mobile device 110 is not provisioned to a user account maintained by the provisioning server, such as servers 130 and 160, for the network or service to which the connectable device is to be provisioned.

By moving the mobile device within NFC range of the NFC tag 144, or the connectable device 141-143, or vice versa, the mobile device 110 obtains, via an NFC transceiver of the mobile device, provisioning information related to the connectable device from an NFC transponder associated with the connectable device (210). As discussed above, provisioning information related to the connectable device may include information related to the respective device, such as model number, serial number, name brand, and the like, as well as a user name, a user account information, security features such as a user account passcode, a biometric, an audio or an image-based security input, and the like. The provisioning information is used in a network procedure for provisioning the connectable device. Other connectable device-related information, such as network address, cellular telephone number, associated user name or user account identifier, is stored by at least one or more of a content service provider provisioning server 160, a provisioning server 130, and a mobile device 110 as a result of the provisioning of the connectable device, or used for establishing communication with the connectable device.

The connectable device may also stored information as a result of the provisioning. For example, activation of a device on many types of networks involve a network assignment of one or more identifiers to the device. Cellular networks typically assign one or more telephone numbers (e.g. Mobile Directory Number and possibly a Mobile Identification Number) to a device. Provisioning a new device may entail loading any such identifier(s) into the device for future network communications. The provisioning of the connectable device therefore may involve a processor in the connectable device may receive and store in a memory any network assigned identifier(s) needed to enable the device to communicate through the network. The application may also cause the connectable device to store other information such as user account information, anonymized user identifying information, (such as a user name, and the like) including security feature information, a network server name, a network server address, and/or other similar information related to the provisioning network or service. In addition, the actual provisioning and related information provided to different elements of the system, however, may vary, for example, depending on the type and/or configuration of the particular network or other service into which the connectable device is being provisioned.

In response to obtaining the provisioning information from the connectable device, the mobile device analyzes, for example, the obtained provisioning data and determines that the user is attempting to provision a device. For example, the obtained provisioning information may include the address of a provisioning server or other data that indicates to the mobile device how the obtained provisioning information should be processed. Based on the analysis, the mobile device processor responds to the obtained provisioning information by launching a provisioning application. Alternatively, the provisioning application may launch before obtaining the provisioning information, for example, in response to a user input to a user interface element of the mobile device 110, or some other input (e.g. based on a location determination, such as when the mobile device 110 is inside an electronics store). For example, the user may select an icon presented on a user interface element of the mobile device 110 to launch the provisioning application. The provisioning application, in some examples, is a client application configured to act as a frontend for web portal of a provisioning server.

the determination of which server to establish a communication session with is made based on the obtained provisioning information of the connectable device 120. If the provisioning information includes an address of a provisioning server, the provisioning application may prompt the user to confirm that the server address is the server that the user would prefer to provision the connectable device. For example, if the connected device 120 is associated with a specific content provider (e.g., Netflix™ or Amazon™), the specific content provider and/or server will be identified to the user, and if confirmed that server is sent a request to establish the communication session. Alternatively, if a specific network carrier (e.g., Sprint™ or AT&T™) is associated with the connected device 120, the specific network carrier will be identified to the user, and that carrier is sent the request. Of course, a network carrier, which may be a cellular provider, may also be a digital media content provider. Depending upon the association of the connected device, the provisioning information includes a network address (e.g., a URI) of a provisioning server associated with the respective content provider or network carrier. Alternatively, the mobile device 110 may prompt a user via the provisioning application for an address of a provisioning service or specific content provider provisioning server.

Using the provisioning server address obtained from the provisioning information, the mobile device processor through the launched provisioning application establishes a communication session via the wireless network 120 with a provisioning server, such as provisioning server 130 or 160 (220).

In this first example (illustrated in FIG. 2), the mobile device 110 is not provisioned with a user account in the respective provisioning server 130 or 160. In other words, the provisioning server does not recognize or acknowledge the mobile device 110 as a device that has access to the content or services provided by the network or content service to which the provisioning server belongs. However, an user of the mobile device 110 may have previously established a user account with the provisioning server 130 or 160 through which a user has access to the user account information. A user may log into the provisioning server to access the user's established account or a new created account. For example, the user may enter user account information into a user interface element of the mobile device 110. The user account information may include, for example, a user name, a user account number, passcodes, PIN, user payment information, user purchase history, pending purchases, devices associated with the user account, user account balance, user account spending limits, and the like. In response to establishing or continuing the communication session with the respective provisioning server 130 or 160, the mobile device processor receives an authentication request from the provisioning server 130 or 160 for authenticating a user of the mobile device 110 as being associated with a particular user account for the service supported in part by the respective provisioning server 130 or 160. In response to the authentication request, the provisioning application may cause an authentication prompt to be generated and presented in a user interface element. The authentication request may require the input of user account-related information, such as an account name, account number or the like, and the input of a security feature associated the user account, such as a passcode, a biometric input, a PIN, or the like. In an alternative example, a user of the mobile device 110 through a screen, or prompt, presented on the user interface element may provision the connectable device 141-143 or connectable device tag 144 to a different user's account (e.g. to a family member's account, a business account, an organizational account, or the like) so long as the user has authentication information related to the different user's account. The presented screen, or prompt, may present the different available accounts for provisioning the connectable device for selection by the user via the user interface element.

In response to an input received from a user interface element, the mobile device 110 processor transmits to the provisioning server 130 or 160 a response to the authentication request for authentication processing by the respective provisioning server 130 or 160. The information in the transmitted response allows the user to identify a user account to which the connectable device 141-143 or NFC-enabled label 144 is to be provisioned via the respective server 130 or 160. Using the transmitted information, the respective server 130 or 160 may begin accessing the user account information to authenticate the user.

In response to an acceptable user input and subsequent successful authentication by the provisioning server 130 or 160, the mobile device 110 processor continues with the provisioning process. For example, after authenticating the mobile device 110 user, the provisioning server 130 or 160 may use the user account-related information provided during the authenication process to perform one or more subsequent provisioning server-related steps. Alternatively, if the provisioning server 130 or 160 needs additional information to continue the provisioning process, a request for additional user account information is sent to the mobile device 110. In response to the request, the mobile device 110 may generate a prompt for the user to input additional user account information, such as user account number and the like, and forward the responsive user input information back to the server. For example, during the provisioning process, the prompt may request that user use the cellular-enabled camera 141 or a camera in another device 142-143 to take a picture of an object (e.g., a spoon, a cup, a bus, a cane, a cloud or the like) to provide an image-based security feature, or a face for a biometric input, that is or will be associated with a user or user account (e.g. for future authentication processes).

The processor of the mobile device 100 is further configured to retrieve information identifying the connectable device from the obtained provisioning information. For example, from the provisioning information obtained from the connectable device, the processor may retrieve information related to the connectable device such as the connectable device's International Mobile Station Equipment Identity (IMEI) identifier, subscriber identity module (SIM) identifier, model number, serial number, software/firmware version, processor type identification, memory capacity, or the like.

With the successful authentication of the mobile device 110 user with the user account as discussed above, the information identifying the connectable device, such as connectable device identifiers, and information related to a user account, such as user account number or user name provided as discussed above, is transmitted to a provisioning server (230). For example, the information identifying the connectable device and information related to a user account is included with a HTTP POST command transmitted by the launched provisioning application.

Using the transmitted information, the provisioning server may perform processes that provision the connectable device with a user account. For example, using the user account-related information, the provisioning server may establish a user account or access an existing user account and associate the connectable device to the respective account, e.g. add an identification, etc., of the connectable device to a record for the user account. As outlined earlier, depending on the network configuration and/or the particular service, data may be provided to a server or network element and/or to the connectable device itself, to enable the connectable device to operate and use the applicable service.

Upon completion of the provisioning of the connectable device, the provisioning server may generate a confirmation notification and transmit the confirmation notification to the mobile device. The mobile device receives die confirmation notification from the provisioning server confirming the connectable device is provisioned to the user account (240). An indication of the confirmation of the provisioning of the connectable device to the user account is presented in a user interface element of the mobile device (250).

With the completion of process 200, the connectable device 141-144 is now provisioned in a network or other service and associated with the user account, without the user having to manually access a server through a computer, contact a call center, or having to input long series of numbers and letters or operating information related to the connectable device information.

A provisioned cellular-enabled camera, for example, such as connectable device 141, may transmit images to the network 120 including provisioning server 130 and/or another network connected server so the images may be shared with other user devices. In a further example, the NFC obtained provisioning information may have included the maximum resolution of the camera 141, which may allow the server to identify a suitable compression algorithm for maximizing the data storage allocated to the user account. Similarly, once a Wi-Fi-enabled music/video player, such as connectable device 142, is provisioned with a user account in the network including content provider provisioning server 160 or another associated server, device 142 may connect to the content provider network 150 and allow a user to purchase content, such as videos and music.

In one example, a user may create a new user account via the mobile device 110 prior to or while using the above described process 200 to provision a connectable device. For example, instead of providing an authentication prompt (as in step 230) in the user interface element of the mobile device 110, a prompt to create a new user account is presented. For example, a provisioning server may require input, via a screen or screens presented on the mobile device user interface, user-specific information, such as user name, credit card information, a security feature (e.g. passcode, biometric, image-based, and the like), other users and other devices to be associated with the newly created user account. Once the required user (or different user) account information is provided by the user via the user interface element, the above described process 200 is executed to provision a connectable device to the user account through the respective provisioning server.

in an additional example, using the above described process 200, a user who is not the owner of the mobile device 110 may use the mobile device 110 to provision a connectable device, such as an LTE-enabled digital camera, to a user account owned by the user and maintained by one of the provisioning servers 130 or 160.

FIG. 3 is another process flowchart of an example of a mobile device provisioning a connectable device in a system. In the example illustrated in FIG. 3, the mobile device is already provisioned in the network or service that includes the provisioning server, such as server 130 or 160. In other words, in this example, a user account maintained or accessible by the applicable provisioning server is associated with the mobile device, such as mobile device 110. The mobile device 110 may have user account-related information, such as user names or passcodes, authentication keys stored in a secure element or other memory that may be used in an authentication process to authenticate the mobile device as a trusted source to the server 130 or 160. In response to a successful authentication of the mobile device as a trusted source, the server 130 or 160 would consider any additional information provided by the mobile device as trusted information, and may not perform any security evaluation of the additional information.

For example, a user may place the mobile device and the connectable device within NFC range of each other. With reference to FIG. 3, the mobile device processor obtains via the NFC transceiver of the mobile device, information identifying the connectable device (310). As discussed with FIG. 2, information identifying the connectable device may include the connectable device's International Mobile Station Equipment Identity (IMEI), subscriber identity authentication keys stored in a secure element or other memory that may be used, in an module (SIM), model number, serial number, software/firmware version, processor type identification, memory capacity, or the like. The obtained connectable device information may be stored in memory on the mobile device. In an example, the mobile device processor may be configured to perform preliminary functions with respect to the provisioning of the connectable device based on a recognition of certain data within the Identifying information related to whether a connectable device is provisioned or needs to be provisioned (e.g. a data bit is set to a value indicating to the mobile device that the connectable device needs to be provisioned).

The mobile device processor may determine by analyzing the obtained connectable device information that the connectable device has not been provisioned into any network. In response, the mobile device processor may determine autonomously, or through an interaction with a user, that the connectable device is to be provisioned in a network. The mobile device processor may respond to default or pre-set settings that indicate the networks, such as networks 130 or 160, with which the connectable device is to be provisioned. This information may be used as part of an authentication process described in more detail below.

User account related-information, such as an account user name, an account number, settings related to data usage allocation, such as settings to allocate a portion of the user's monthly data usage (e.g. share plan) to the connectable device, or limit the connectable devices data usage, security information and the like may be, for example, stored on the mobile device. As mentioned above with respect to FIG. 2, the user account related information may be stored in data storage, such as in a secure element on the mobile device, a SIM, or, in a less secure memory of the mobile device depending upon the sensitivity of the information. Alternatively, the data may be stored remotely in a data storage maintained by a third-party server, such as cloud storage, or may be a data storage accessible by the provisioning server. The user account related-information may include, for example, a user's data sharing plan, an International Mobile Station Equipment Identity (IMEI) of the mobile device, an Integrated Circuit Card Identifier (IccID) of the device's subscriber identity module (SIM) of the mobile device, a user name, a user address, a PIN identifier, an account passcode, identifiers of other devices provisioned to the user account, user payment information, user purchase history, pending purchases, devices associated with the user account, user account balance, user account spending limits, and the like. Depending upon the protocols for the provisioning process, the mobile device may be provisioned with data related to a user account maintained by the respective provisioning server. Such data may be stored on the mobile device, or, if the mobile device does not store user account information, the stored data may be security keys related to the user account. In either case, an authentication prompt for inputting the information related to the user account, such as a PIN identifier, a username, or other passcode, may be presented in the at least one user interface element of the mobile device.

Either in response to the obtained identifying information or to an input to the authentication prompt, the mobile device accesses user account-related information stored in a data storage accessible by the mobile device processor (320). For example, the mobile device may access the user account-related information that is resident in data storage on the phone; by receiving input from a user in response to an authentication prompt; or by sending a request to the provisioning server or the third party server to authenticate the mobile device using the user account-related information of the already-provisioned mobile device maintained by the respective provisioning server or third party server.

In an example, upon receiving a successful input, such as security feature (e.g. a PIN or passcode) corresponding to the user account, to the authentication prompt, the mobile device processor launches a provisioning application that interacts with the provisioning server (330). Alternatively, the launched provisioning application may present a provisioning server name(s) with which the user has established user accounts, are the most popular content or service providers, present a number of user accounts that the mobile device is configured to access, or may prompt the user to input a content provider name or network carrier. The provisioning application, in some examples, is a client application configured to act as a frontend for web portal of a service provider server, such as either of the servers 130 and 160; and the provisioning application on the mobile device is configured to retrieve or obtain user account related data from the provisioned mobile device data storage. For example, the provisioning application may be configured to allow a provisioning server to directly retrieve the appropriate data from storage on the mobile device, or, alternatively, configured to obtain the required information by requesting that the mobile device processor provide the requested information.

The provisioning application facilitates establishing a (secure) wireless communication session between the mobile device and the provisioning server using information, such as a server address, obtained from, for example, the connectable device identifying information, from a user input, from a history log maintained by the mobile device and/or the respective provisioning server, or based on a setting in the mobile device. The history log may include a list of devices and respective user accounts that a mobile device has provisioned. The history log may be accessible by the provisioning application, which may inquire through the user interface element whether a user wants to share the history log with the provisioning server or a content/service provider server. Of course, any shared history log data is anonymized to provide data that is only specific to the connectable device and/or mobile device. The history log may be used, for example, for analysis of the effectiveness of the provisioning process, determining connectable device features that are most popular (e.g. LTE-enabled cameras versus Wi-Fi or CDMA enabled cameras, the types of service plans, or data packages, that are being provisioned with the connected devices, cameras with certain image resolution ranges are the most popular, mobile device models that are most frequently used in the self-provisioning process, and the like). In addition, a history log containing the connectable device models and service plans being provisioned may be used by a product or service provider to perform a market analysis of the current market demands for certain connectable device models and to predict future trends. Furthermore, a service provider may use the history log data related to service plans to develop more competitive service plans for users. Via the provisioning application and the wireless communication session, the mobile device processor transmits user authenticating information and the connectable device identifying information to the provisioning server (340). Examples of user authenticating information includes information that was input by a user, such as a security features associated with the user account, and/or information retrieved from the user account related information, such as security keys, usernames, user account number, and the like.

The provisioning server may, for example, use the user account related-information to authenticate the mobile device, identity the user account to which the connectable device is to be provisioned, identify the extent of services that are to be provided to the connectable device, and/or the like. The provisioning server may complete the provisioning process, and generate a confirmation signal that is transmitted to the mobile device.

The mobile device via the wireless communication session receives the confirmation signal for the provisioning server (350), and presents an indication of the confirmation in the user interface element of the provisioning of the connectable device to the user account associated with the mobile device (360).

In another example, the mobile device 110 processor is configured to present a user interface via the at least one user interface element, for receiving inputs. Inputs received through the user interface element are used to associate the connectable device to the provisioned mobile device. This can be done by modifying user account settings stored in the provisioned mobile device. The user authentication information transmitted in step 340 above may include data retrieved from the modified user account settings that indicate the association of the connectable device to the provisioned mobile device and the user account.

In some examples, the mobile device 110 is provisioned in and receives services and/or digital media content through a first network, such as a network or service associated with provisioning server 130 and on-line service providing server 135, but is not provisioned in a second network or other service system, such as may be associated with or supported by the communication network provisioning server 160 and communication/services server 165. As a result, the mobile device 110, when provisioning a connectable device into the first network or service, performs the provisioning process described with respect to FIG. 3 and, when provisioning a connectable device into the second network or service, performs the provisioning process described with respect to FIG. 2. For example, although provisioned in the first network, which may be a cellular provider network, through server 135, a mobile device 110 user may wish to provision a connectable device, such as camera 141, in the second system, which may be a digital image sharing service hosted by content/services provider server 165. In such a situation, the mobile device 110 may interact with server 160 according to the provisioning process described with respect to FIG. 2 to provision the connectable device with the image sharing service provided by, for example, another server 165. Although FIG. 1 shows only two pairs of servers, 160 and 165, 130 and 135, coupled to the respective networks (120 and 150) to provide the provisioning process and services, it is envisioned that additional system, network and server configurations may be implemented to provide the disclosed provisioning process and services.

FIG. 4 illustrates a mobile device 110 and a connectable device 43 that are NFC enabled or equipped for a relatively short range wireless communication between the mobile device 110 and an NFC enabled device 43. The connectable device 43 represents a variety of NFC enabled devices related to a connectable device that may include an NFC chipset. For example, a near field communication (NFC) system in the mobile device 110 communicates with the connectable device 43 to provide, for example, data to or receive information from the connectable device 43. In order to begin communications between the mobile device 110 and the connectable device 43, a user brings the NFC enabled mobile device 110 within close proximity (e.g., 2 to 4 cm or less, although in some cases the distance may be up to 30 cm) of the NFC-enabled, connectable device 43, or vice versa. An application installed on the mobile device 110 responds to NFC events detected by the NFC system (436 and 438) in the mobile device 110, and commences a contactless data flow by establishing communication with the connectable device 43.

in some examples, the connectable device 43 is not itself NFC-enabled, in which case, a NFC label or tag is affixed to the connectable device 43 or packaging of the connectable device 43 or is otherwise provided with the connectable device 43. In this later example, the NFC label, such as NFC-enabled label or tag 144, is encoded with provisioning information for the connectable device.

Near field communication (NFC) can occur in different modes, such as card emulation mode, peer-to peer modes or a read/write mode. In a card emulation mode, the mobile device 110 generates a magnetic field via its antenna 438 and initiates the exchange of information with the connectable device 43 (e.g., a connectable device, such as an LTE-enabled camera) or a NFC-enabled label or tag 144. The magnetic field carries a low-level protocol exchange to perform a transfer of information from the connectable device 43 to the mobile device 110. Either the connectable device 43 or the mobile device 110 may be the initiator of the exchange. Information transferred to the mobile device 110 from the connectable device 43 or a NFC-enabled label or tag 144 may be stored in a secure element (SE) 437 or RAM 416.

In a second mode of operation, such as peer-to -peer (P2P), the mobile device 110 may initiate a data exchange with a connectable device 141-143. such data exchange is defined, for example, in the ISO 18092 standard. In P2P mode, both devices (mobile device 110 and NFC-enabled, connectable device 43 in this example) play a symmetric role in that both may generate a magnetic field and transmit and receive data. If a security function, such as an authentication process using secure information stored on the secure element 437, is required due to the nature of the exchange, the payload from the NFC enabled, connectable device 43 is evaluated by a rule-set of the security element 437 before routing the information in the payload to the host controller 412. However, if a security function is not required, the payload is sent to the host controller 412 for processing.

In a read and/or write mode, the mobile device 110 initiates communication with an NFC-enabled device 43. In this (read and/or write) mode, the mobile device 110 is used to emulate the behavior of a contactless card reader. For example, the mobile device 110 communicates with an NFC-enabled, connectable device 43 to access information identifying the connectable device 43, such as SIM identifier or the like as described above. When a mobile device 110 is brought within range of the NFC-enabled connectable device 141-143 or NFC label 144, the NFC controller on the mobile device 110 detects the presence of a contactless NFC device, generates a magnetic field, which is used to power the contactless NFC device. Of course, the connectable device 43 may also have its own power source. The NFC-enabled device 43 responds with relevant content, such as a URL, SMS text message, or the like.

As in the P2P case, in one example, only if the authentication criterion is met by the SE 437 does the NFC controller allow the host controller 412 to process the data message (e.g., link to an URL) provided by the NFC-enabled device 43.

The different NFC modes of operation may be implemented via a variety of types of mobile devices having a host controller 412, memory 416 and 414. NFC 436 with a security element 437, and an NFC enabled device 43, which often will also include a processor, memory and an RF (contactless) communication capability. It may be helpful to consider examples of a mobile device 110 and an NFC enabled device 43 in somewhat more detail.

It should be appreciated that the disclosed subject matter may be implemented using any mobile computing device having NFC communication capability and mobile communication capability, configured to use those capabilities to conduct mobile transactions, e.g. for provisioning other devices and data exchange, as discussed herein. In the example of FIG. 4, the mobile device 110 is in the form of a smart phone type mobile handset including a touch screen display 420. Examples of touch screen type mobile devices that may be used to implement mobile device 110 may include (but are not limited to) a smart phone, personal digital assistant (PDA), tablet computer or other portable device with NFC capability. However, the structure and operation of the touch screen type mobile device 110 is provided by way of example; and the subject technology as described herein is not intended to be limited thereto. For purposes of this discussion. FIG. 4 provides a block diagram illustration of the exemplary mobile device 110 having a touch screen display for displaying content and receiving user input as (or as part of) the user interface.

Also, as shown in FIG. 4, the mobile device 110 includes a microphone 402 for audio signal input and a speaker 404 for audio signal output. The microphone 402 and speaker 404 are communicatively coupled to a voice or audio encoder/decoder (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications. In addition, the mobile device 110 includes at least one digital transceiver (XCVR) 408, for digital wireless communications via a wide area wireless mobile communication network, although the mobile device 110 may include additional digital or analog transceivers (not shown). The transceiver 408 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 408 provides two-way wireless communication of information including digitized audio signals, still image and/or video signals, web page information for display as well as web related inputs, and various types of mobile message communications to/from the mobile device 110.

the mobile device may also include a subscriber identification module (SIM) (not shown) the host controller (processor) 412 may access information of the SIM to perform authentication of the user, authentication of the mobile device and other functions. The SIM may include information, such as a user profile information that includes services and features the user is provided, such as a user's data sharing plan, a user's service agreement, such as content a user is allowed to access, the International Mobile Subscriber Identity (IMSI), security information, such as passcodes and encryption information, and other information. The SIM may also be an NFC-enabled SIM, which is a SIM that includes near field communication capabilities within SIM. The NFC-enabled SIM foregoes the need for a separate NFC transponder or chip set 436, to be built into the mobile device 110. In examples using an NFC-enabled SIM, all of the provisioning information may be obtained from the NFC-enabled SIM.

Several types of communications through the transceiver 408 and a network, as discussed later, will relate to provisioning of connectable device 43 by a remote server, such as servers 130 and 160 of FIG. 1. Provisioning system related communications involving information obtained from the NFC enabled connectable device 43, for example, often utilize Internet Protocol (IP) packet data transport utilizing the digital wireless transceiver (XCVR) 408 and over the air communications to and from base stations of the serving mobile network. Such communications may include specific provisioning system account related data and security information from the mobile device 110, as well as payload information received from an NFC enabled device 43 during a particular communication. Accordingly, such wireless provisioning data communications may include at least some of the data obtained from the NFC enabled connectable device 43.

In an example, the transceiver 408 also sends and receives a variety of signaling messages in support of various voice and data services provided by a network of a wireless service provider, to a user of mobile device 110 via the mobile communication network. Transceiver 408 connects through radio frequency (RF) send-and-receive amplifiers (not separately shown) to an antenna 409. Transceiver 408 may also support various types of mobile messaging services, such as short message service (SMS), enhanced messaging service (EMS), and/or multimedia messaging service (MMS).

Many modern mobile devices also support wireless local area network communications over Wi-Fi or Bluetooth, instead of or in addition to data communications using the wide area mobile communication network. Hence, in the example of FIG. 4, for packet data communications, the exemplary mobile device 110 may also include a Wi-Fi transceiver 410 and associated antenna 411 and Bluetooth transceiver 414a and associated antenna 414b. Although Wi-Fi is used here as the example, the transceiver 410 may take the form of any available two-way wireless local area network transceiver of a type that is compatible with one or more standard protocols of communication implemented in wireless local area networks, such as one of the Wi-Fi standards under IEEE 802.11 and/or WiMAX. The transceiver 410, for example, may provide two-way data transport for wireless communication with a wireless access point in a residence or enterprise that the user frequents or with any available hotspot offered in a public venue. Although communicating through a different network or networks, the transceiver 410 supports various types of data communications similar to the packet data communications supported via the mobile network transceiver 408, including communications related to a provisioning system or user account related communications involving data obtained from the NFC-enabled, connectable device 43 and provisioning the secure element 437 with data obtained from a remote server.

The mobile device 110 further includes a microprocessor, sometimes referred to herein as the processor 412, which serves as a programmable controller for mobile device 110 by configuring mobile device 110 to perform various operations, for example, in accordance with instructions or programmming executable by processor 412. For example, such operations may include various general operations of the mobile device 110 as well as operations related to the communication with the NFC-enabled device 43 and conducting related transactions as described herein. A flash memory 414 is used to store, for example, applications, such as provisioning application 414a, programming or instructions for execution by the processor 412. Of course, other applications may also be stored in flash memory 414. Depending on the type of device, the mobile device 110 stores and runs an operating system through which specific applications may be run on the device. Examples of operating systems include Android, Apple iOS (I-Phone or iPad devices), Windows Mobile, RIM BlackBerry operating system, or the like. Flash memory 414 may also be used to store mobile configuration settings for different mobile applications or services executable at mobile device 110 (using processor 412). Mobile device 110 may also include a non-volatile random access memory (RAM) 416 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the interaction with the NFC enabled device 43 and related transactions, as described herein. Program aspects of the technology may be thought of as "products" or "articles of manufacture" typically in the form, of executable code or process instructions and/or associated data that is stored on or embodied in a type of machine or processor readable medium.

A mobile device supporting read/write, P2P, and card emulation and related provisioning communications of the type under consideration here, may include a variety of different types of user interface elements. For discussion purposes, in the smart phone example shown in FIG. 4, the user interface elements of mobile device 110 include a touch screen display 420 (also referred to herein as "touch screen 420" or "display 420"). For output purposes, the touch screen 420 includes a display screen, such as a liquid crystal display (LCD) or the like. For input purposes, touch screen display 420 includes a plurality of touch sensors 422. Other interface elements may include a keypad including one or more keys 430. For example, the keypad may be implemented in hardware as a T9 or QWERTY keyboard of mobile device 110 and keys 430 may correspond to the physical keys of such a keyboard. Alternatively, keys 430 (and keyboard) of mobile device 110 may be implemented as "soft keys" of a virtual keyboard graphically represented in an appropriate arrangement via touch screen display 420. The soft keys presented on the touch screen display 420 may allow the user of mobile device 110 to invoke the same user interface functions as with the physical hardware keys. In some configurations, the microphone 402 and speaker 404 may be used as additional user interface elements, for audio input and output, including with respect to some functions related to die provisioning processing and communication, as described herein.

For output, touch screen display 420 is used to present information (e.g., text, video, graphics or other visible content) to the user of mobile device 110. Host processor 412 controls visible display output on the LCD or other display element of the touch screen display 420 via a display driver 424, to present the various visible outputs to the device user. For example, some of the provisioning related programming may cause the processor 412 to operate the driver 424 to cause screen 420 to display visible multimedia information about a user account, user credentials, the connectable device, the provisioning system, in general, or related services.

In general, touch screen display 420 and touch sensors 422 (and one or more keys 430, if included) are used to provide the textual and graphical user interface for the mobile device 110. In an example, touch screen display 420 provides viewable content to the user at mobile device 110. Touch screen display 420 also enables the user to interact directly with the viewable content provided in the content display area, typically by touching the surface of the screen with a finger or an implement such as a stylus.

As shown in FIG. 4, the mobile device 110 also includes a sense circuit 428 coupled to touch sensor 422 for detecting the occurrence and relative location/position of each touch with respect to a content display area of touch screen display 420. In this example, sense circuit 428 is configured to provide processor 412 with touch-position information based on user input received via touch sensors 422.

The user interface capabilities of the mobile device 110 provide output to and receive input from the user of the mobile device 110, for any of the various functions, operations or applications of the device. For example, programming (discussed more later) that configures the mobile device 110 to obtain and act on information from the NFC enabled device 43 and causes the mobile device to perform provisioning processes, authentication processes and the like, may cause the mobile device to display and/or audibly output a prompt to the user and receive a responsive user input for communication of information to the appropriate provisioning server.

Many implementations of mobile devices support location based services. Location information today may be used in a variety of services/applications. There are a variety of ways that a mobile device 110 may be configured to obtain information as to current location of the device. In another example, the mobile device 110 includes a global positioning satellite (GPS) receiver 432 and associated antenna 434. GPS is a space-based satellite navigation system that provides location and time information anywhere on Earth, where there is an unobstructed line of sight to at least three, or more of the GPS satellites. In an example, location based information may be used during an authentication process of the mobile device 110 as an additional method of authenticating a user; or a provisioning process involving the mobile device 110 and a connectable device 43 may use the location during provisioning to, for example, assign a location or location-based name to the connectable device being provisioned.

As discussed, the mobile device 110 also has NFC communication capability. NFC may be used for a variety of different functions or applications of the mobile device 110. However, for purposes of this discussion, the mobile device 110 interacts with the NFC-enabled connectable device 43 via the NFC communication capability of the mobile device 110 as part of operations to provision NFC communication capability of the mobile device 110 as part of operations to provision NFC-enabled connectable device 43 for a communication and/or content related service. NFC is a set of standards for smart phones and similar devices, such as the exemplary mobile device 110 discussed here, to establish radio communication with other such devices as well as with compatible NFC readers by coming to close proximity (e.g., 4-10 cm or less). Due to its short range and support for encryption, NFC communication is suitable for secure communication over short distances. Each NFC-enabled mobile device or NFC-enabled device includes a transceiver configured to communicate with other NFC capable equipment.

Hence, the exemplary mobile device 110 further includes an NFC sensor. The NFC sensor may be implemented in a variety of ways. In the exemplary mobile device 110 of FIG. 4, the NFC sensor includes an NFC type radio frequency transceiver 436a, which is formed by an NFC chipset 436. The NFC chipset 436 provides two-way wireless communication of information in accordance with NFC technology and protocols. The NFC chipset 436 includes an NFC controller 436b. For simplicity, the NFC chipset 436 is sometimes referred to herein as the NFC controller 436, while it will be understood that it is a controller within the NFC chipset 436. The exemplary NFC sensor also includes an antenna, such as coil antenna 438. The NFC chipset 436 of device 110 connects to the NFC coil antenna 438, for transmitting and receiving NFC communications to/from other NFC compatible devices with compatible transceivers over short air link distances. The transceiver 436a formed by the NFC chipset 436 also sends and receives a variety of signaling messages for establishing NFC links with other NFC-enabled devices and sends and receives various user data over the established NFC links. The signaling, for example, may allow the transceiver formed by the NFC chipset 436 to detect proximity of another NFC capable device (e.g. device 43), establish an NFC link with the other device, trigger execution of an appropriate application within the mobile device 110 and send and/or receive data for the application as between the mobile device 110 and the other NFC capable device.

Also included in the mobile device 110 is a subscriber identification module (SIM) (not shown), the mobile device 110 may access information on the SIM to perform authentication of the user, authentication of the mobile device and other functions. The SIM may include information, such as a user profile information that includes services and features for which the user is eligible, the International Mobile Subscriber Identity (IMSI), security information, such as passcodes and encryption information, and other information.

In order to run secure applications such as payment access to data, such as user account information, routing to an URL site, and die like, there is a Secure Element (SE) 437. In one example, the SE 437 is separate chip that includes tamper-proof storage and execution memory and is configured to communicate with an NFC controller 436b (a secure processor). The NFC controller 436b is different from the host processor 412 in that it focuses on enabling secure transactions with, for example, the SE 437. The SE 437 contains applications (e.g., applets 451-453) that use, for example, secure encryption keys running inside the secure processor. For example, there may be at least one applet 452 for processing of the user account information and connectable device information; and at least one applet 453 for processing of different types of communications, such as a read/write or a P2P operation for other (e.g. non-provisioning) purposes. Of course, more applets may provide additional functionality, such as security management and authentication.

For example, the applications that run on the SB 437 typically run on a Javacard operating system. The SE 437 may include various account information, such as account number, user identification, a personal identification number (PIN), or the like for user verification and possibly account balance and/or provisioning record information, in various examples, the secure element may be part of a subscriber identification module (SIM) chip or a separate secure element like a secure digital (SD) memory card used for storing and accessing applications and data in a secure manner.

Although cryptographic elements are not separately shown, the NFC chip 436 is also configured such that transmissions to the NFC enabled, connectable device 43 are encrypted. In one example, communications between the SE 437 and the provisioning server may also be encrypted. Accordingly, the secure data storage and encrypted communication provide enhanced security and reduce the likelihood of fraud against a user's payment account or user credentials.

The connectable device 43 in the illustrated example includes a power supply module 464, an NFC transmitter 464 and associated coil antenna 469, and one or more memories 444, such as a secure memory and a non-volatile (NV) memory. The connectable device 43 includes a processor serving as the central processing unit (CPU) 443 of the chip 463 and a bus system 441. The connectable device 43, depending on its configuration, may include a wireless transceiver, such as a Bluetooth transceiver 445 and Wi-Fi transceiver 442. Although not shown, the device 43 will typically include other components specific to its design and intended purpose, e.g., camera components, speakers. In the example, the NFC components are integral and interact with other electronic components of the device 43.

Alternatively, in other examples, the connectable device 43 is not NFC-enabled, and the NFC related component takes the form similar to NFC-enabled label or tag 144. In which case, the NFC label or tag 144 is affixed to the connectable device 43, affixed to packaging of the connectable device 43 or is simply provided with the connectable device 43, but does not connect or couple to electronics of the device 43 for communicate between the tag and the device 43. For example, instead of using an onboard power supply, the power module 464 may collect energy at the time of a communication from the RF transmissions from the mobile device 110 via inductive coupling. Power may be obtained via the coil antenna 469 or another inductive coil (not separately shown) in or connected to the chip 463. The power module 464 converts the collected energy to one or more appropriate direct current (DC) voltage levels and distributes the resulting DC power to the other elements on the chip 463, as needed.

The exemplary NFC transceiver 464 connects to the coil antenna 469, for transmitting and receiving RF communication to/from the NFC enabled mobile device 110. Hence, the chipset 436 and NFC transceiver 464 are sufficiently compatible to enable the mobile device 110 to detect and communicate with an NFC enabled device 43.

The memory 444 of the NFC enabled device 43 stores data and/or executable programming tor the CPU 443. For example, the memory may store URL information of the provisioning system server.

The bus 444 supports signaling and transfer of data and/or instructions as between various elements on the chip 463 including the CPU 443, the memory 444 and the NFC transceiver 464. The memory 444 and programming execution by the CPU 443 provide data storage.

Also included in some examples of the connectable device 43 is a subscriber identification module (SIM) 455, the mobile device 110 may access information on the SIM 455 via the NFC 467 transceiver to perform authentication of the user, authentication of the mobile device and other functions. The SIM 455 may include information, such as device information that includes services and features for which the device is capable of providing, for example, the International Mobile Subscriber Identity (IMSI), security information, such as passcodes and encryption information, and other information. The SIM 455 may also be an NFC-enabled SIM, which is a SIM that includes near field communication capabilities within the SIM, The NFC-enabled SIM 455 foregoes the need for a separate NFC transponder to be built into the connectable device 43.

At least some aspects of the methods of provisioning a connectable device outlined above may be embodied in programming, e.g. for the mobile device, the connectable device, and/or the provisioning system server. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the provisioning system into the computer platform of a user mobile device or a connectable device. Thus, another type of media that may bear the software elements includes optical, electrical and elecromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take may forms, including but not limited to, a tangible storage medium, a carrier wave medium or physical transmission medium. Non-volatile storage media include, for example, optical or magnetic disks, such as any of the storage devices in any computer(s) or the like, such as may be used to implement the connectable device provisioning service, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example; a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer or the like can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes and other specifications that are set forth in this specification, including in the claims that follow, are approximate, not exact. They are intended to have reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the mature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter. claimed subject matter.

What is claimed is:

1. A mobile device, comprising:
   at least one user interface element;
   a wireless communication transceiver;
   a storage device;
   a near field communication (NFC) transceiver; and
   a processor coupled to the at least one user interface element, the wireless communication transceiver and the NFC transceiver,
   wherein the processor is configured to control the mobile device to perform functions, including functions to:
      obtain, via the NFC transceiver, provisioning information related to a connectable device;
      retrieve information identifying the connectable device from the obtained provisioning information;
      transmit to a provisioning server the information identifying the connectable device and information related to a user account;
      receive a signal from the provisioning server confirming the connectable device is provisioned to the user account; and
      receive, based on the connectable device being provisioned, services comprising at least one of cellular communication services, data sharing services, navigation services, content delivery services, or digital media services.

2. The mobile device of claim 1, wherein the processor is further configured to control the mobile device to perform functions, including functions to:
   retrieve the information related to the user account from the storage device.

3. The mobile device of claim 1, wherein the processor is further configured to control the mobile device to perform functions, including functions to:
   present in the at least one user interface element a prompt for inputting the information related to the user account.

4. The mobile device of claim 1, wherein the processor is further configured to control the mobile device to perform functions, including functions to:
   establish, via the wireless communication transceiver, a communication session with the provisioning server using an address of a provisioning server retrieved from the provisioning information.

5. The mobile device of claim 1, wherein the processor is further configured to control the mobile device to perform functions, including functions to:
   in response to obtaining the provisioning information related to the connectable device via the NFC transceiver, launch a provisioning application; and
   present in the at least one user interface element a prompt requesting user account information based on execution of the provisioning application.

6. The mobile device of claim 1, wherein the obtained provisioning information includes a device identifier of the connectable device.

7. The mobile device of claim 1, wherein the obtained provisioning information includes a subscriber identification module (SIM) number of the connectable device.

8. The mobile device of claim 1, wherein the mobile device is provisioned to the user account in a network.

9. The mobile device of claim 1, wherein the processor is further configured to control the mobile device to perform functions, including functions to:
   in response to receiving an authentication request from the provisioning server, present a prompt, in the at least one user interface element, requesting a user to input a security feature associated with the user account; and
   transmit the inputted response to the provisioning server.

10. The mobile device of claim 1, wherein the mobile device is provisioned in a network and the processor is further configured to control the mobile device to perform functions, including functions to:

present, via the at least one user interface element, a user interface for receiving inputs to associate the connectable device to the provisioned mobile device;

in response to receiving inputs associating the connectable device to the provisioned mobile device, modify user account settings stored in the provisioned mobile device to indicate the association of the connectable device to the provisioned mobile device and the user account; and transmit the modified user account settings to the provisioning server.

11. A method, comprising:

obtaining, via a near field communication (NFC) transceiver in a mobile device, provisioning information related to a connectable device from an NFC transponder associated with the connectable device;

in response to obtaining the provisioning information, establishing, via a wireless communication transceiver in the mobile device, a communication session with a provisioning server;

transmitting, via the communication session with the provisioning server, information obtained from the provisioning information that identifies the connectable device and information related to a user account;

presenting, in a user interface element of the mobile device, a confirmation of the provisioning of the connectable device to the user account; and receiving, based on the provisioning of the connectable device, services that comprise at least one of cellular communications services, data sharing services, navigation services, content delivery services, or digital media services.

12. The method of claim 11, further comprising:

launching a provisioning application on the mobile device that interacts with the provisioning server.

13. The method of claim 11, further comprising:

presenting, via the user interface element of the mobile device, a prompt for a user to input a secure identification prior to establishing the communication session with the provisioning server.

14. The method of claim 11, wherein the transmitted connectable device identifying information includes a device hardware identification or a device subscriber identification module identifier.

15. A method, comprising:

obtaining, by a mobile device processor via a near field communication (NFC) transceiver of a mobile device, information identifying a connectable device;

in response to obtaining the identifying information, accessing user account-related information by the mobile device processor;

transmitting user authenticating information retrieved from the accessed user account-related information and the information identifying the connectable device, via a wireless communication transceiver, to a provisioning server for provisioning the connectable device in a network;

presenting, in a user interface element of the mobile device, a confirmation of the provisioning of the connectable device to the user account associated with the mobile device; and receiving, based on the mobile device being provisioned, services comprising at least cellular communications services, data sharing services, navigation services, content delivery services, or digital media services.

16. The method of claim 15, wherein the mobile device is provisioned to the user account, and accessing user account-related information comprises:

retrieving the user account-related information from a data storage accessible by the mobile device.

17. The method of claim 15, wherein accessing user account-related information comprises:

presenting a user input prompt via the user interface element of the mobile device requesting user account information.

18. The method of claim 15, wherein the user authenticating information is an identifier associated with the user account.

19. The method of claim 15, wherein the user authenticating information is a user account number.

20. The method of claim 15, further comprising:

in response to obtaining the identifying information, launching by the mobile device processor a provisioning application that interacts with the provisioning server.

* * * * *